United States Patent
Kagawa (10) Patent No.: US 8,525,456 B2
(45) Date of Patent: Sep. 3, 2013

(54) ELECTRIC PUMP DEVICE

(75) Inventor: Hiroki Kagawa, Kashiba (JP)

(73) Assignee: JTEKT Corporation, Osaka-shi (JP)

( * ) Notice: Subject to any disclaimer, the term of this patent is extended or adjusted under 35 U.S.C. 154(b) by 391 days.

(21) Appl. No.: 12/992,435

(22) PCT Filed: May 21, 2009

(86) PCT No.: PCT/JP2009/059352
§ 371 (c)(1),
(2), (4) Date: Nov. 12, 2010

(87) PCT Pub. No.: WO2009/142264
PCT Pub. Date: Nov. 26, 2009

(65) Prior Publication Data
US 2011/0095714 A1 Apr. 28, 2011

(30) Foreign Application Priority Data
May 21, 2008 (JP) .................................. 2008-133313

(51) Int. Cl.
*H02H 7/08* (2006.01)
(52) U.S. Cl.
USPC .................... 318/400.21; 318/400.2; 318/561
(58) Field of Classification Search
USPC .................... 318/400.21, 400.2, 561, 400.11, 318/400.09, 635, 578, 275
See application file for complete search history.

(56) References Cited

U.S. PATENT DOCUMENTS

2006/0222527 A1 10/2006 Kurita et al.
2007/0221287 A1* 9/2007 Izumoto .......................... 141/38

FOREIGN PATENT DOCUMENTS

| JP | A-61-170291 | 7/1986 |
| JP | A-2006-067640 | 3/2006 |
| JP | A-2006-233867 | 9/2006 |
| JP | A-2006-254648 | 9/2006 |

OTHER PUBLICATIONS

International Search Report in International Application No. PCT/JP2009/059352; dated Aug. 4, 2009 (with English-language translation).
International Preliminary Report on Patentability in International Application No. PCT/JP2009/059352; dated Jan. 11, 2011.

\* cited by examiner

*Primary Examiner* — Karen Masih
(74) *Attorney, Agent, or Firm* — Oliff & Berridge, PLC (57) ABSTRACT

Provided is an electric pump device that can continue to supply hydraulic pressure to hydraulically actuated equipment and that is also of reduced size. An electric pump device is provided with an oil pump that supplies oil to a stepless transmission device, a brushless motor that drives the oil pump, and a control device that controls the brushless motor. The control device is provided with a power supply part that supplies drive power to the brushless motor, and an out-of-synch determination part that determines whether or not the brushless motor is out of synch. The control device is provided with a drive control part that controls the power supply part so that supply of power to the brushless motor is stopped, and then controls the power supply part so that the brushless motor is started, when the out-of-synch determination part determines that the brushless motor is out of synch.

3 Claims, 7 Drawing Sheets

ELECTRIC PUMP DEVICE

FIELD OF THE INVENTION

The present invention relates to an electric pump device including an oil pump, a brushless motor, and a controller.

BACKGROUND OF THE INVENTION

Conventionally, an electric pump device has been known as a device for supplying oil to a hydraulic device such as a continuously variable transmission (CVT) or a power steering device of a vehicle (see, for example, Patent Document 1).

Figure 7:
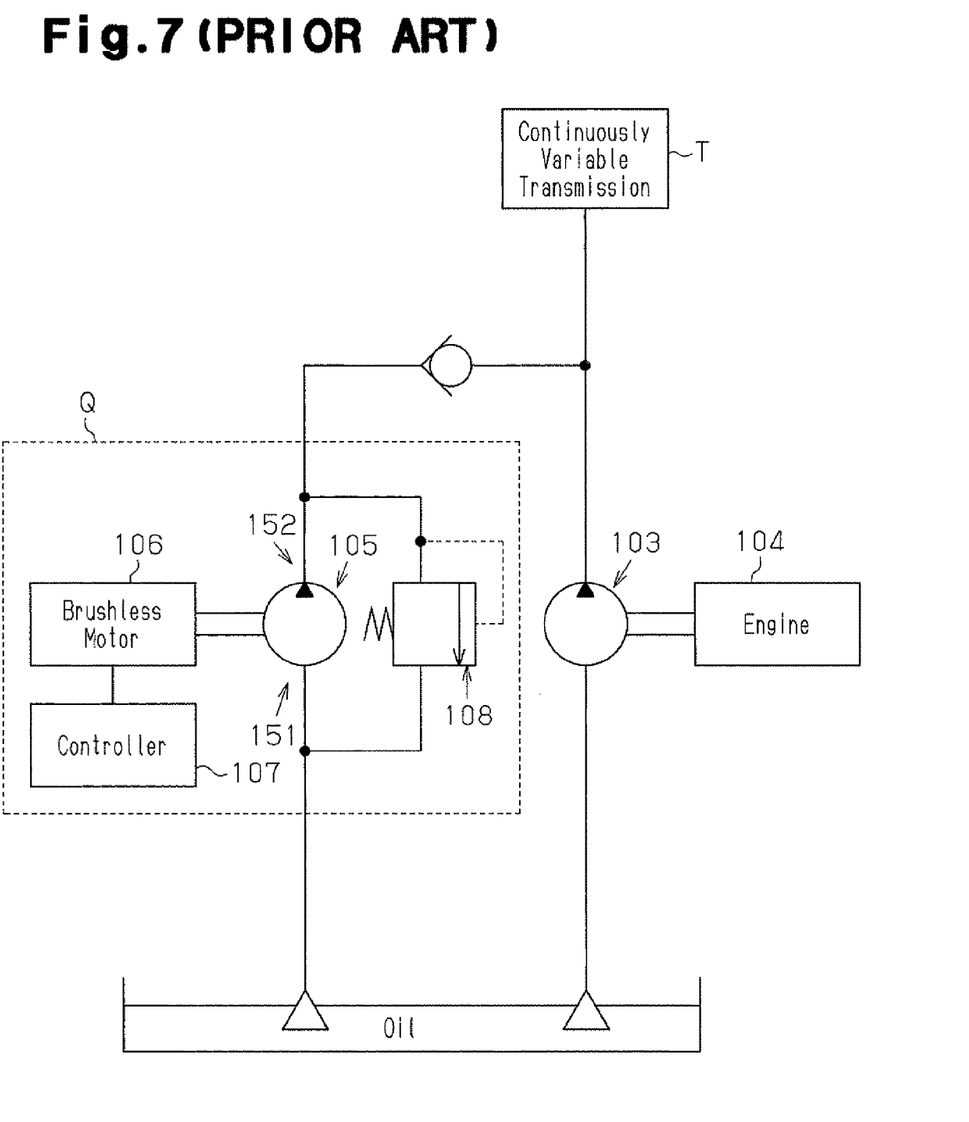
FIG. 7 is a circuit diagram illustrating the configuration of a conventional electric pump device and oil supply to a hydraulic device using the electric pump device.

More specifically, an electric pump device Q, for example, is known. As shown in FIG. 7, the electric pump device Q has an oil pump 105, which is driven by a brushless motor 106 to apply hydraulic pressure to a continuously variable transmission T, which is a hydraulic device. The electric pump device Q is employed in combination with a mechanical oil pump 103, which is driven by an engine 104. When the mechanical oil pump 103 cannot supply a sufficient amount of oil to the continuously variable transmission T, the electric pump device Q supplies oil to the continuously variable transmission T in an assisting manner.

The electric pump device Q includes the oil pump 105, which supplies oil to the continuously variable transmission T, the brushless motor 106 for driving the oil pump 105, and a controller 107 that controls the brushless motor 106. The electric pump device Q further includes a relief valve 108 that prevents loss of synchronism of the brushless motor 106.

When the oil pump 105 supplies an excessive amount of oil from an inlet portion 151 to an outlet portion 152 of the oil pump 105, the relief valve 108 returns the oil from the outlet portion 152 to the inlet portion 151 of the oil pump 105. Accordingly, even if the hydraulic pressure at the outlet portion 152 of the oil pump 105 is raised through excessive oil supply, the electric pump device Q having the relief valve 108 lowers the hydraulic pressure at the outlet portion 152 so as to prevent the brushless motor 106 from receiving excessive load. This prevents loss of synchronism of the brushless motor 106.

PRIOR ART DOCUMENT

Patent Document

Patent Document 1: Japanese Laid-Open Patent Publication No. 2006-233867

SUMMARY OF THE INVENTION

As has been described, the electric pump device Q is capable of preventing loss of synchronism of the brushless motor 106 and ensures continuous application of hydraulic pressure by supplying oil to the continuously variable transmission T. However, the electric pump device Q must include the relief valve 108 to prevent loss of synchronism of the brushless motor 106. As a result, despite the demand that vehicle components be reduced in size, electric pump devices, which supply oil to hydraulic devices including a continuously variable transmission, are enlarged in size.

Accordingly, it is an objective of the present invention to provide a compact electric pump device that is capable of continuously applying hydraulic pressure to a hydraulic device.

In accordance with a first aspect of the present invention, an electric pump device is provided that includes an oil pump that supplies oil to a hydraulic device, a brushless motor including a rotor that drives the oil pump, and a controller that controls the brushless motor. The controller includes a power supply section that supplies drive power to the brushless motor, a synchronism loss determining section that determines whether the brushless motor has lost synchronism, and a drive control section. When the synchronism loss determining section determines that the brushless motor has lost synchronism, the drive control section controls the power supply section to start the brushless motor after controlling the power supply section to stop supply of the drive power to the brushless motor.

In this configuration, when the synchronism loss determining section determines that the brushless motor has lost synchronism, the drive control section controls the power supply section to stop supply of the drive power to the brushless motor. Accordingly, when it is determined that the brushless motor, which drives the oil pump, has lost synchronism, the supply of the drive power to the brushless motor is stopped. In this manner, the controller restores the state before controlling the brushless motor to start. The drive control section then controls the power supply section to start the brushless motor after having controlled the power supply section to stop the supply of the drive power to the brushless motor. This lowers the hydraulic pressure at an outlet portion of the oil pump in the period from when the brushless motor loses synchronism and thus the rotation speed of the rotor drops to when the brushless motor is restarted. The brushless motor is restarted to resume the supply of the oil after the hydraulic pressure at the outlet portion of the oil pump has been reduced. As a result, the hydraulic pressure is continuously applied to the hydraulic device. Also, it becomes unnecessary to arrange a relief valve to prevent loss of synchronism of the brushless motor, thus decreasing the size of the electric pump device.

The rotor of the brushless motor preferably includes permanent magnets as field magnets, and the controller preferably further includes an induced voltage detecting section that detects an induced voltage generated through rotation of the rotor and a memory section storing a comparison reference voltage, which is used to determine whether the brushless motor has lost synchronism. In this case, the synchronism loss determining section preferably determines whether the brushless motor has lost synchronism by comparing the induced voltage with the comparison reference voltage.

In this configuration, the synchronism loss determining section determines whether the brushless motor has lost synchronism by comparing the induced voltage generated through rotation of the rotor of the brushless motor with the comparison reference voltage stored in the memory section. As a result, the synchronism loss determining section easily determines whether the brushless motor has lost synchronism by performing a comparison computation.

The controller is preferably a controller that estimates the position of the rotor using the induced voltage detected by the induced voltage detecting section in order to control the brushless motor.

In this configuration, in order to control the brushless motor, the controller estimates the position of the rotor using the induced voltage. This makes it unnecessary for the controller to include a position sensor to detect the position of the rotor, thus further reducing the size of the electric pump device. The induced voltage, using which the position of the rotor is estimated, is detected by the induced voltage detecting section, which detects the induced voltage, which is compared with the comparison reference voltage to determine whether the brushless motor has lost synchronism. In this manner, the induced voltage detecting section is employed to detect both of the induced voltage used to estimate the position of the rotor and the induced voltage to be compared with the comparison reference voltage to determine whether the brushless motor has lost synchronism. This simplifies the configuration of the controller compared to a case in which separate induced voltage detecting sections are arranged to detect the respective induced voltages.

DETAILED DESCRIPTION OF THE PREFERRED EMBODIMENTS

One embodiment of the present invention will now be described with reference to FIGS. 1 to 4.

Figure 1:
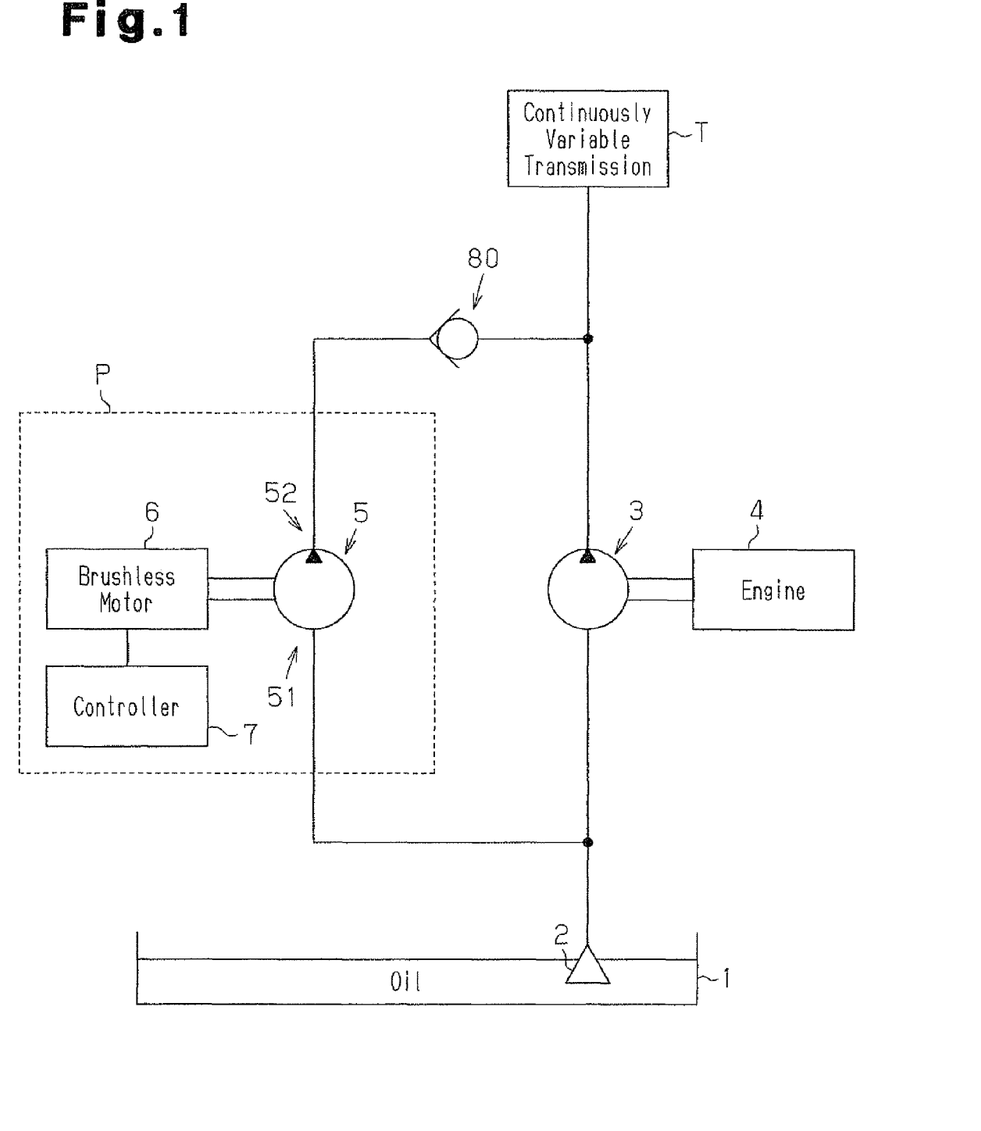
FIG. 1 is a circuit diagram illustrating an electric pump device according to one embodiment of the present invention and oil supply to a hydraulic device using the electric pump device.

As illustrated in FIG. 1, an electric pump device P of the present embodiment is a device employing an electric pump mounted in a vehicle (not shown). The electric pump device P is used in combination with a mechanical oil pump 3 driven by an engine 4, which is an internal combustion engine. When the mechanical oil pump 3 cannot supply oil to a continuously variable transmission T, which is a hydraulic device, the electric pump device P operates to apply hydraulic pressure to the continuously variable transmission T.

When the engine 4 operates, the mechanical oil pump 3 supplies oil from an oil pan 1 to the continuously variable transmission T through an oil strainer 2, thus applying hydraulic pressure. However, when the engine 4 is stopped, the mechanical oil pump 3 cannot supply oil to the continuously variable transmission T. Accordingly, the electric pump device P supplies the oil from the oil pan 1 to the continuously variable transmission T through the oil strainer 2 as needed. A check valve 80 is arranged between the continuously variable transmission T and the electric pump device P to prevent oil from returning from the continuously variable transmission T to the electric pump device P.

The electric pump device P is formed by an oil pump 5 that supplies oil to the continuously variable transmission T, a brushless motor 6 that drives the oil pump 5, and a controller 7 that controls the brushless motor 6.

More specifically, the oil pump 5 is, for example, a gear pump that transports oil through meshing of teeth of two gears. The oil pump 5 has a first gear (not shown) and a second gear (not shown) received in a pump housing (not shown). The first gear is connected to a drive shaft rotated by the brushless motor 6. The second gear is meshed with the first gear. The oil pump 5 draws oil into the pump housing via an inlet port (not shown) of an inlet portion 51 and sends the oil out from the pump housing to an outlet port (not shown) of the outlet portion 52. In this manner, the oil pump 5 supplies oil to the continuously variable transmission T.

Figure 2:
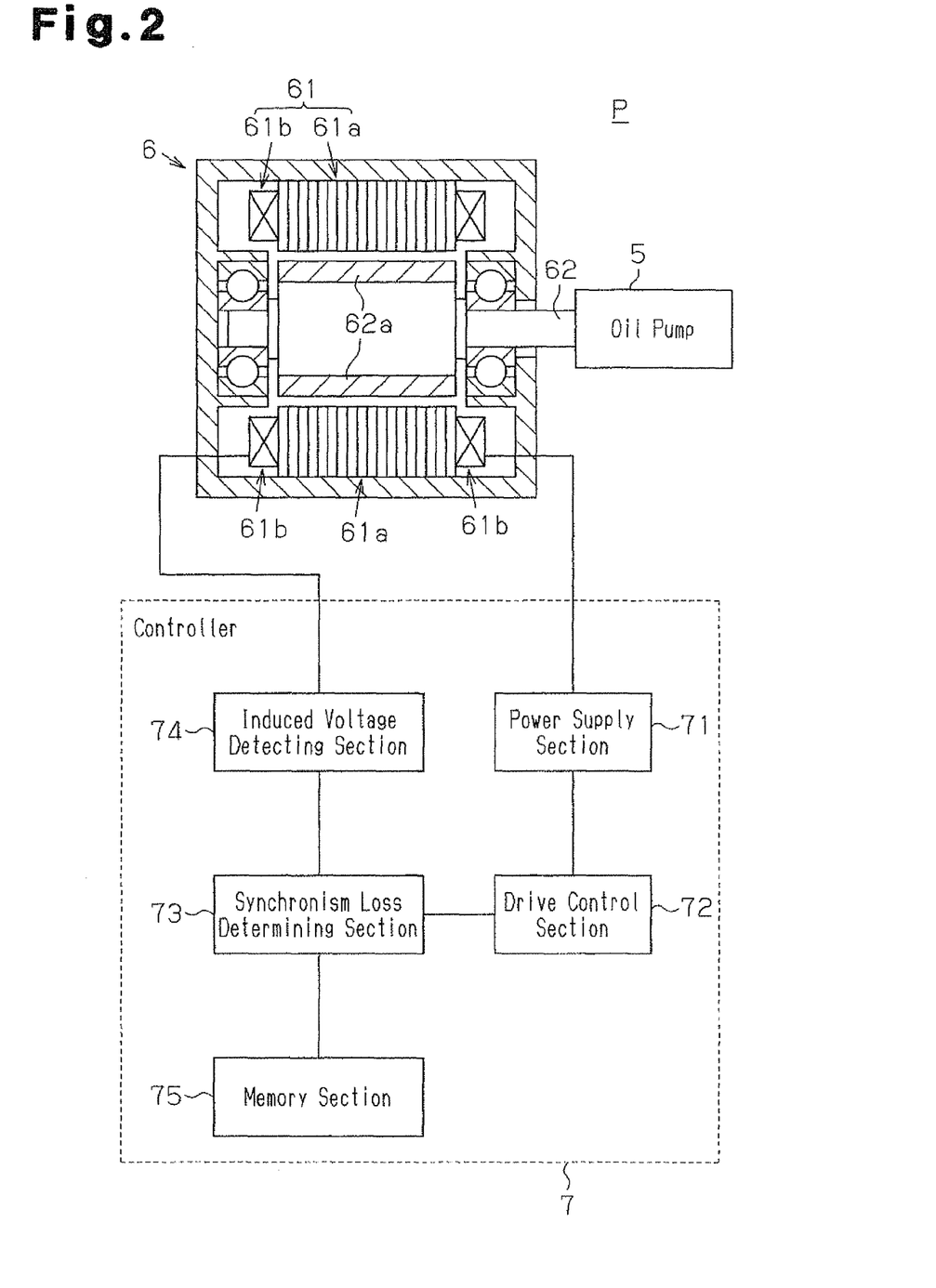
FIG. 2 is a diagram schematically illustrating the electric pump device of the embodiment of the invention.

With reference to FIG. 2, the brushless motor 6 includes a stator 61, which is an electromagnet that generates a rotating magnetic field, and a rotor 62 having permanent magnets 62a as field magnets. The brushless motor 6 is a permanent magnet synchronous motor and a brushless DC motor. The stator 61 has a stator core 61a, which is an iron core, and three-phase coils 61b formed by conductive wires wrapped around the stator core 61a. The drive power supplied to the brushless motor 6 applies positive voltage and negative voltage alternately to each of the three-phase coils 61b. This generates a rotating electric field and thus rotates the rotor 62. The rotor 62 forms the drive shaft of the oil pump 5, which is rotated by the brushless motor 6.

The controller 7 includes a power supply section 71 and a drive control section 72. The power supply section 71 supplies drive power to the brushless motor 6. The drive control section 72 controls the power supply section 71 to control operation of the brushless motor 6. In other words, the power supply section 71 supplies drive power, which is power for rotating the rotor 62 of the brushless motor 6, to the brushless motor 6 and is formed by, for example, a power source circuit (not shown) having a switching element (not shown). The drive control section 72 controls the operation of the brushless motor 6 by regulating supply of the drive power to the brushless motor 6 by the power supply section 71. The drive control section 72 is formed by, for example, a high-speed computer such as a digital signal processor (DSP), which operates the aforementioned switching element.

The present embodiment is characterized in that the controller 7 includes the power supply section 71, a synchronism loss determining section 73, and the drive control section 72. When the synchronism loss determining section 73 determines that the brushless motor 6 has lost synchronism, the drive control section 72 controls the power supply section 71 to suspend supply of the drive power to the brushless motor 6. Afterwards, the drive control section 72 controls the power supply section 71 to start the brushless motor 6. The configuration of the controller 7 of the electric pump device P according to the present embodiment and the operation of the electric pump device P having the controller 7 according to the embodiment will hereafter be described in detail.

The controller 7 also includes the synchronism loss determining section 73, an induced voltage detecting section 74, and a memory section 75. The synchronism loss determining section 73 determines whether the brushless motor 6 has lost synchronism. The induced voltage detecting section 74 detects induced voltage (which is, back electromotive force) generated in the coils 61b through rotation of the rotor 62. The memory section 75 stores a comparison reference voltage, which is used to determine whether loss of synchronism has occurred.

Figure 3A:
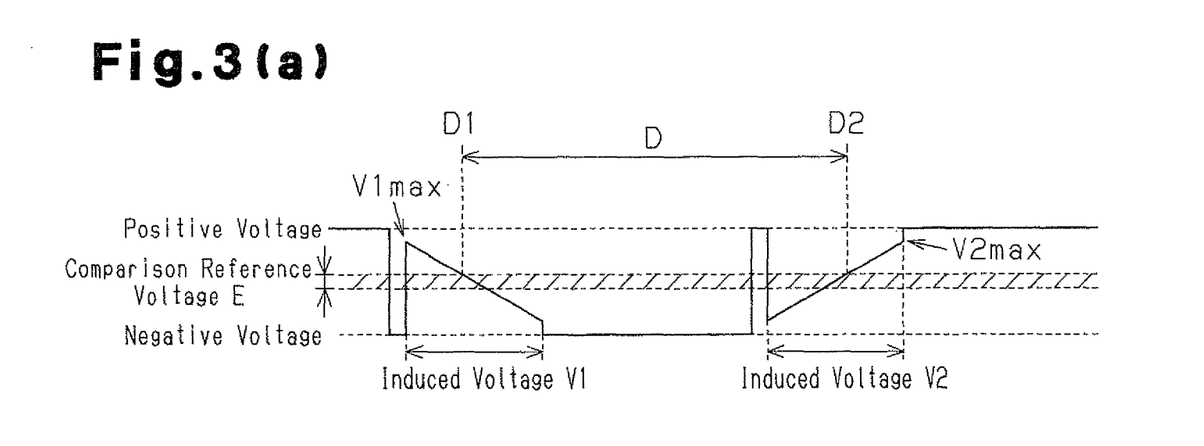
FIG. 3 includes graphs representing a voltage waveform of coils, in which (a) is a graph for explanatory illustration of induced voltage generated in a normal rotation state of a brushless motor, and (b) is a graph for explanatory illustration of induced voltage generated in a state immediately before the brushless motor loses synchronism.

More specifically, the induced voltage detecting section 74 is a voltage detection circuit for detecting induced voltage. As illustrated in FIG. 3(a), the induced voltage detecting section 74 detects, for example, induced voltage V1 and induced voltage V2. The induced voltage V1 is generated when the voltage applied to each coil 61b is switched from the positive voltage to the negative voltage. The induced voltage V2 is generated when the voltage applied to the coil 61b is switched from the negative voltage to the positive voltage. The induced voltage V1 and the induced voltage V2 are cyclically detected in an alternating manner. The induced voltage detected by the induced voltage detecting section 74 is input to the synchronism loss determining section 73.

The synchronism loss determining section 73 is a processing unit, which, for example, performs computation procedures in accordance with programs stored in the memory section 75. To determine whether the brushless motor 6 has lost synchronism, the synchronism loss determining section 73 performs comparison computation between the induced voltage detected by the induced voltage detecting section 74 and the comparison reference voltage, with which it is determined whether loss of synchronism has occurred. In correspondence with a result of determination whether the brushless motor 6 has lost synchronism, which is obtained through the comparison computation, the drive control section 72 controls the operation of the brushless motor 6.

The comparison reference voltage is stored in the memory section 75. The memory section 75 is formed by a memory such as a ROM or a flash memory. The comparison reference voltage E is a voltage approximately equal to the center of fluctuation of the voltage applied to the brushless motor 6. More specifically, as indicated by the diagonally shaded areas in FIG. 3, the comparison reference voltage E has a width smaller than the amplitude of each induced voltage V1, V2, which is generated in the coils 61b. The voltage in the center of the width corresponds to the voltage in the center of the fluctuation of each induced voltage V1, V2.

In the present embodiment, the controller 7 estimates the position of the rotor 62, which is the position of a magnetic pole of the permanent magnet 62a of the rotor 62, using the induced voltage detected by the induced voltage detecting section 74. In accordance with the position of the magnetic pole, the controller 7 controls the brushless motor 6 to rotate the rotor 62. In other words, the controller 7 is a position-sensorless controller.

Figure 4:
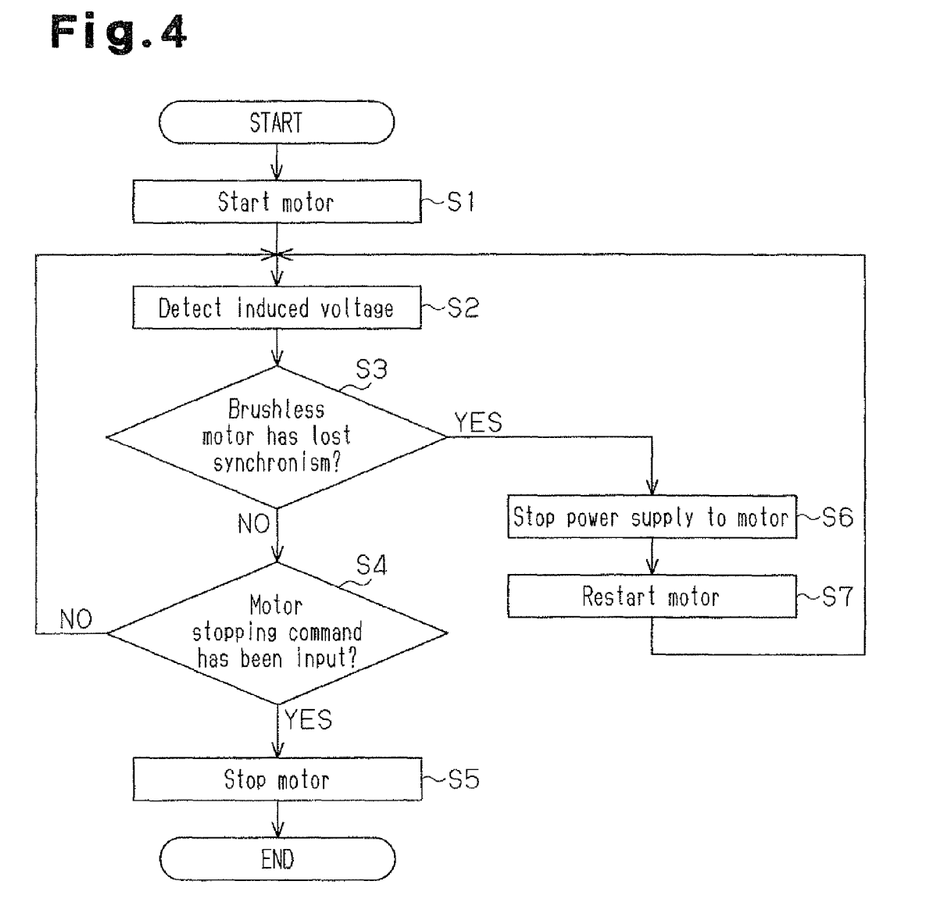
FIG. 4 is a flowchart representing operation of the electric pump device of the embodiment of the invention.

Operation of the electric pump device P of the present embodiment will now be described with reference to FIG. 4.

First, the drive control section 72 controls the power supply section 71 to start the brushless motor 6 based on an external signal, thus starting the brushless motor 6 (Step S1). More specifically, by controlling the drive power supplied to the brushless motor 6 by the power supply section 71, the controller 7 controls to start the brushless motor 6. As a result, the rotor 62 rotates synchronously with the rotating magnetic field generated by the stator 61. As the brushless motor 6 is started in this manner, the rotor 62, which is the drive shaft of the oil pump 5, is rotated to drive the oil pump 5.

Subsequently, the induced voltage detecting section 74 detects induced voltage generated in the coils 61b (Step S2). Next, the synchronism loss determining section 73 compares the detected induced voltage with the comparison reference voltage, which is stored in advance in the memory section 75. In this manner, the synchronism loss determining section 73 determines whether the brushless motor 6 has lost synchronism (Step S3).

Figure 3B:
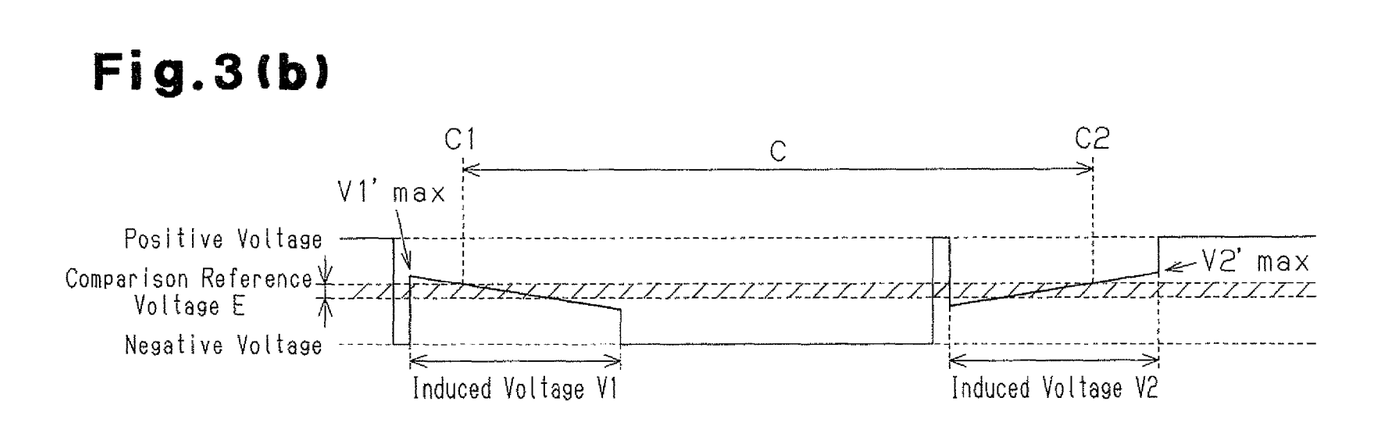

Normally, the rotor 62 rotates at the rotation speed of the rotating magnetic field generated by the stator 61 (that is, at the synchronous speed). However, when the hydraulic pressure at the outlet portion 52 of the oil pump 5 rises to such a level that load is applied to the brushless motor 6, it becomes difficult for the rotor 62 to rotate at the synchronous speed. At this stage, the brushless motor 6 loses synchronism. The amplitude of the induced voltage generated in each coil 61b varies in proportion to the rotation speed of the rotor 62. Accordingly, if the brushless motor 6 loses synchronism, the rotation speed of the rotor 62 drops and the rotor 62 stops rotating. As a result, the maximum positive value V1'max of the induced voltage V1 in the state immediately before the loss of synchronism of the brushless motor 6, which is indicated in FIG. 3(b), is smaller than the maximum positive value V1max of the induced voltage V1 in a normal rotation state of the brushless motor 6, which is indicated in FIG. 3(a). The normal rotation state of the brushless motor 6 is a state in which the brushless motor 6 rotates without losing synchronism. Similarly, the maximum positive value V2'max of the induced voltage V2 in the state immediately before the loss of synchronism of the brushless motor 6 is smaller than the maximum positive value V2max of the induced voltage V2 in the normal rotation state of the brushless motor 6. The period from when the rotation speed of the rotor 62 decreases and the induced voltage V1 becomes equal to the comparison reference voltage E to when the induced voltage V2 exceeds the comparison reference voltage E is great in the state immediately before the loss of synchronism, compared to the normal rotation state.

Accordingly, in Step S3, using the fact that the period from when the rotation speed of the rotor 62 decreases and the induced voltage V1 becomes equal to the comparison reference voltage E to when the induced voltage V2 exceeds the comparison reference voltage E is great in the state immediately before the loss of synchronism compared to the normal rotation state, it is determined whether the brushless motor 6 has lost synchronism. In other words, in Step S3, through the comparison computation between the induced voltage and the comparison reference voltage, the synchronism loss determining section 73 obtains a time point D1, at which the induced voltage V1 becomes equal to the comparison reference voltage E, and a time point D2, at which the induced voltage V2 exceeds the comparison reference voltage E, thus determining a period D from the time point D1 to the time point D2, as illustrated in FIG. 3(a). If the period D is greater than a reference period C (see FIG. 3(b)) from a time point C1, at which the induced voltage V1 becomes equal to the comparison reference voltage E, to a time point C2, at which the induced voltage V2 exceeds the comparison reference voltage E, in the state immediately before the loss of synchronism of the brushless motor 6, the synchronism loss determining section 73 determines that the brushless motor 6 has lost synchronism. In contrast, if the period D is equal to or shorter than the reference period C, the synchronism loss determining section 73 determines that the brushless motor 6 maintains synchronism. The reference period C is preferably stored in advance in the memory section 75.

Alternatively, in Step S3, the synchronism loss determining section 73 may determine that the brushless motor 6 has lost synchronism if the comparison computation between the induced voltage and the comparison reference voltage cannot be carried out normally. Specifically, since the amplitude of the induced voltage is related to the rotation speed of the rotor 62, the amplitude of the induced voltage V1, V2 decreases as the rotation speed of the rotor 62 drops. Accordingly, if it is difficult to accurately determine the time point D1, at which the induced voltage V1 becomes equal to the comparison reference voltage E, or the time point D2, at which the induced voltage V2 exceeds the comparison reference voltage E in a predetermined error range, it may be determined, in Step S3, that the brushless motor 6 has lost synchronism. In the present embodiment, the comparison reference voltage E is not a single constant value, but includes a predetermined range of values having an upper limit and a lower limit. If "the induced voltage V1 becomes equal to the comparison reference voltage E", it is indicated that the induced voltage V1 becomes equal to any value in the range of the values of the comparison reference voltage E. If "the induced voltage V2 exceeds the comparison reference voltage E", it is indicated that the induced voltage V2 exceeds the upper limit of the comparison reference voltage E. Accordingly, when the induced voltage V1 or the induced voltage V2 is maintained in the range of the values of the comparison reference voltage E, thus making it impossible to specify the time point at which the induced voltage V1, V2 exceeds the range of the values of the comparison reference voltage E, it may be determined that the brushless motor 6 has lost synchronism. Also, the comparison reference voltage E may be set to a constant value.

When the synchronism loss determining section 73 determines that the brushless motor 6 maintains synchronism in Step S3, the drive control section 72 determines whether a motor stopping command has been input from the exterior (Step S4). If the motor stopping command has not been input in Step S4, the procedure after Step S2 is repeated. If the motor stopping command has been input in Step S4, the drive control section 72 controls the power supply section 71 to stop supply of the drive power to the brushless motor 6, thus stopping the brushless motor 6 (Step S5).

Contrastingly, when the synchronism loss determining section 73 determines that the brushless motor 6 has lost synchronism in Step S3, the drive control section 72 controls the power supply section 71 to stop supply of the drive power to the brushless motor 6 (Step S6). Accordingly, when it is determined that the brushless motor 6 has lost synchronism, the power supply section 71 is controlled to stop the drive power supply to the brushless motor 6 so that the state of the controller 7 is returned to the state before the brushless motor 6 has been controlled to start the brushless motor 6.

After the power supply section 71 is controlled to stop the drive power supply to the brushless motor 6 in Step S6, the drive control section 72 controls the power supply section 71 to restart the brushless motor 6 (Step S7). In other words, the drive control section 72 controls the drive power supplied to the brushless motor 6 by the power supply section 71 so that the rotor 62 restarts to rotate synchronously with the rotating magnetic field generated by the stator 61. After the brushless motor 6 has been started in Step S7, the procedure after Step S2 is repeated.

Accordingly, in the period from when the brushless motor 6 loses synchronism and the rotation speed of the rotor 62 decreases to when the brushless motor 6 is restarted in Step S7, the hydraulic pressure at the outlet portion 52 of the oil pump 5 is lowered by, for example, a valve (not shown) for regulating the hydraulic pressure, which is arranged in the continuously variable transmission T. As a result, in Step S7, the brushless motor 6 is started and supply of oil to the continuously variable transmission T is resumed with the hydraulic pressure at the outlet portion 52 maintained at a decreased level.

The period from when the drive control section 72 controls the power supply section 71 to stop the power supply to the brushless motor 6 in Step S6 to when the drive control section 72 controls the power supply section 71 to restart the brushless motor 6 in Step S7, which is the restarting period, is, for example, 50 milliseconds. If the restarting period is excessively long, the hydraulic pressure applied to the continuously variable transmission T is blocked for an excessively long time. As a result, the restarting period is preferably short.

The electric pump device P of the above described embodiment has the advantages described below.

(1) The controller 7 has the power supply section 71, the synchronism loss determining section 73, and the drive control section 72. The power supply section 71 supplies the drive power to the brushless motor 6. The synchronism loss determining section 73 determines whether the brushless motor 6 has lost synchronism. The drive control section 72 controls the power supply section 71 to stop supply of the drive power to the brushless motor 6 when the synchronism loss determining section 73 determines that the brushless motor 6 has lost synchronism. Accordingly, when it is determined that the brushless motor 6, which drives the oil pump 5, has lost synchronism, the drive power supply to the brushless motor 6 is stopped to return the state of the controller 7 to the state before the brushless motor 6 has been controlled to start. Subsequently, after the drive control section 72 controls the power supply section 71 to suspend the drive power supply to the brushless motor 6, the drive control section 72 controls the power supply section 71 to start the brushless motor 6. Accordingly, in the period from when the brushless motor 6 loses synchronism and the rotation speed of the rotor 62 drops to when the brushless motor 6 starts to rotate, the hydraulic pressure at the outlet portion 52 of the oil pump 5 is lowered. After the hydraulic pressure at the outlet portion 52 of the oil pump 5 is decreased, the brushless motor 6 is started to resume the oil supply. As a result, the hydraulic pressure is continuously applied to the continuously variable transmission T. Further, it becomes unnecessary to arrange a relief valve 108 that prevents loss of synchronism of the brushless motor 6, which is the relief valve 108 of the conventional device illustrated in FIG. 7. The electric pump device P is thus reduced in size.

(2) The synchronism loss determining section 73 determines whether the brushless motor 6 has lost synchronism by comparing the induced voltage detected by the induced voltage detecting section 74 with the comparison reference voltage, which is stored in the memory section 75. Accordingly, the synchronism loss determining section 73 easily determines whether the brushless motor 6 has lost synchronism by performing comparison computation.

(3) To control the brushless motor 6, the controller 7 estimates the position of the rotor 62 using the induced voltage detected by the induced voltage detecting section 74. This makes it unnecessary to arrange a position sensor (not shown) for detecting the position of the rotor 62, thus further reducing the size of the electric pump device P. The induced voltage, using which the position of the rotor 62 is estimated, is detected by the induced voltage detecting section 74, which detects the induced voltage to be compared with the comparison reference voltage to determine whether the brushless motor 6 has lost synchronism. As a result, the induced voltage detecting section 74 is used to both estimate the position of the rotor 62 and determine whether loss of synchronism has occurred. This simplifies the configuration of the controller 7 compared to a case in which separate induced voltage detecting sections (not shown) must be arranged in accordance with the respective uses.

The present invention is not limited to the above embodiment, but can be modified in various forms within the spirit of the present invention. The modifications are not excluded from the scope of the present invention. For example, the above embodiments may be modified as follows.

In the above-described embodiment, it is determined whether the brushless motor 6 has lost synchronism using the period from when the induced voltage V1 becomes equal to the comparison reference voltage E to when the induced voltage V2 exceeds the comparison reference voltage E. However, it may be determined whether loss of synchronism has occurred by any other suitable method than the method of the embodiment.

Figure 5A:
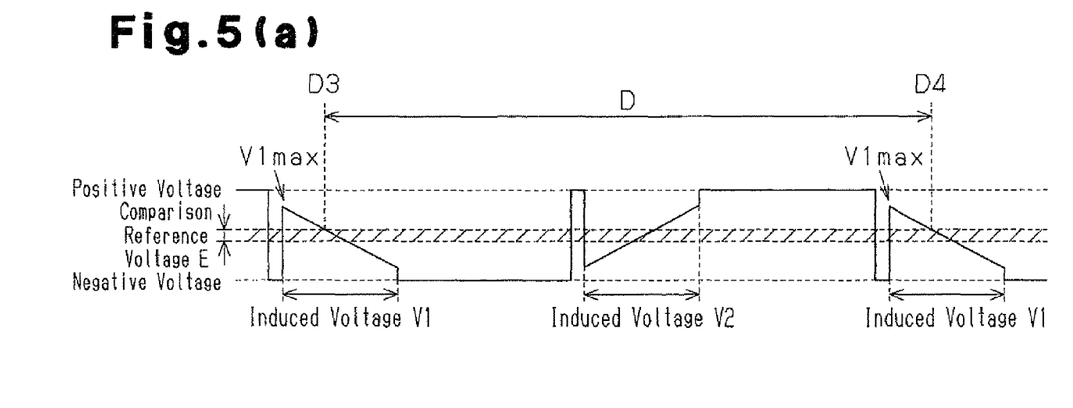
FIG. 5 includes graphs representing a voltage waveform of coils, in which (a) is a graph for explanatory illustration of induced voltage generated in a normal rotation state of a brushless motor, and (b) is a graph for explanatory illustration of induced voltage generated in a state immediately before the brushless motor loses synchronism.
Figure 5B:
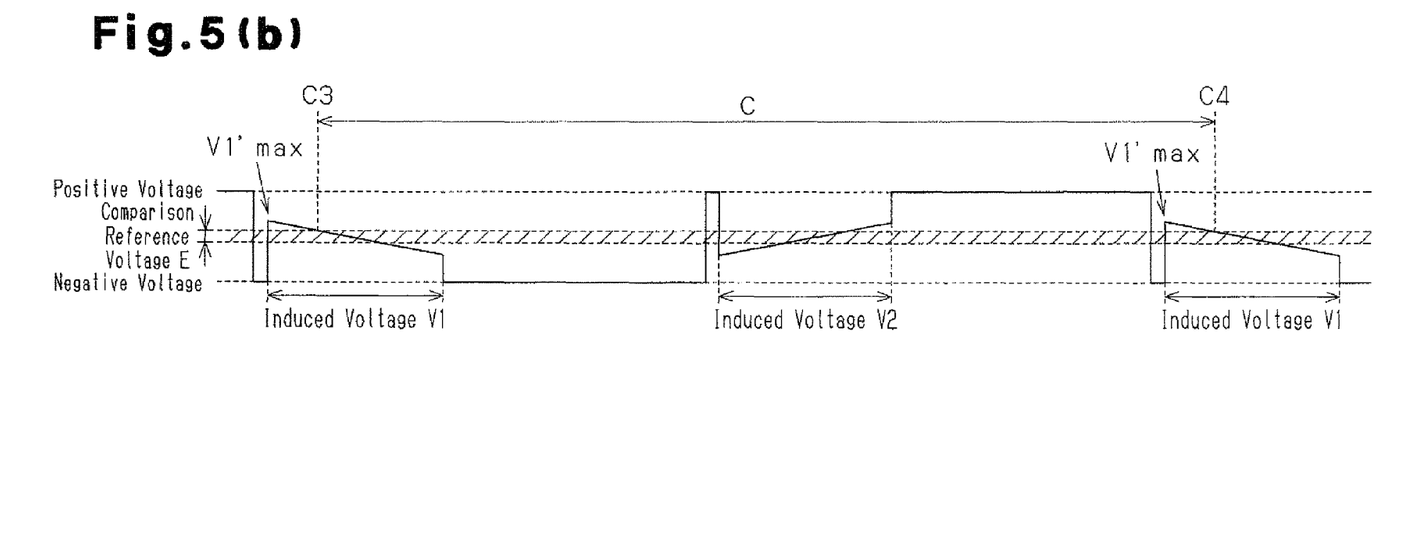

As has been described, the induced voltage V1 and the induced voltage V2 are cyclically detected in an alternating manner. Accordingly, the synchronism loss determining section 73 may determine whether the brushless motor 6 has lost synchronism based on the time point at which only the induced voltage V1, which is cyclically detected, becomes equal to the comparison reference voltage E. Specifically, the positive maximum value V1'max of the induced voltage V1 is small immediately before the brushless motor 6 loses synchronism, as illustrated in FIG. 5(b), compared to the corresponding value in the normal rotation state of the brushless motor 6 illustrated in FIG. 5(a). Also, the period from when the induced voltage V1 becomes equal to the comparison reference voltage E as the rotation speed of the rotor 62 drops to when the induced voltage V1 of the subsequent cycle becomes equal to the comparison reference voltage E is long in the state immediately before the loss of synchronism, compared to the normal rotation state. Accordingly, in Step S3, for example, this fact may be used to determine whether the brushless motor 6 has lost synchronism. In this case, through comparison computation between the induced voltage and the comparison reference voltage, the synchronism loss determining section 73 determines, as illustrated in FIG. 5(a), the time point D3, at which the induced voltage V1 becomes equal to the comparison reference voltage E, and the time point D4, at which the induced voltage V1 of the subsequent cycle becomes equal to the comparison reference voltage E. Then, the synchronism loss determining section 73 obtains a time period D from the time point D3 to the time point D4. If the obtained time period D is longer than a reference time period C (see FIG. 5(b)) in the state immediately before the brushless motor 6 loses synchronism, the synchronism loss determining section 73 determines that the brushless motor 6 has lost synchronism. If the time period D is equal to or shorter than the reference time period C, the synchronism loss determining section 73 determines that the brushless motor 6 maintains synchronism. The reference time period C is the time period from the time point C3 at which the induced voltage V1 of the current cycle becomes equal to the comparison reference voltage E to the time point C4 at which the induced voltage V1 of the subsequent cycle becomes equal to the comparison reference voltage E in the state immediately before the brushless motor 6 loses synchronism. As in the above-described embodiment, the reference time period C is preferably stored in advance in the memory section 75.

Figure 6A:
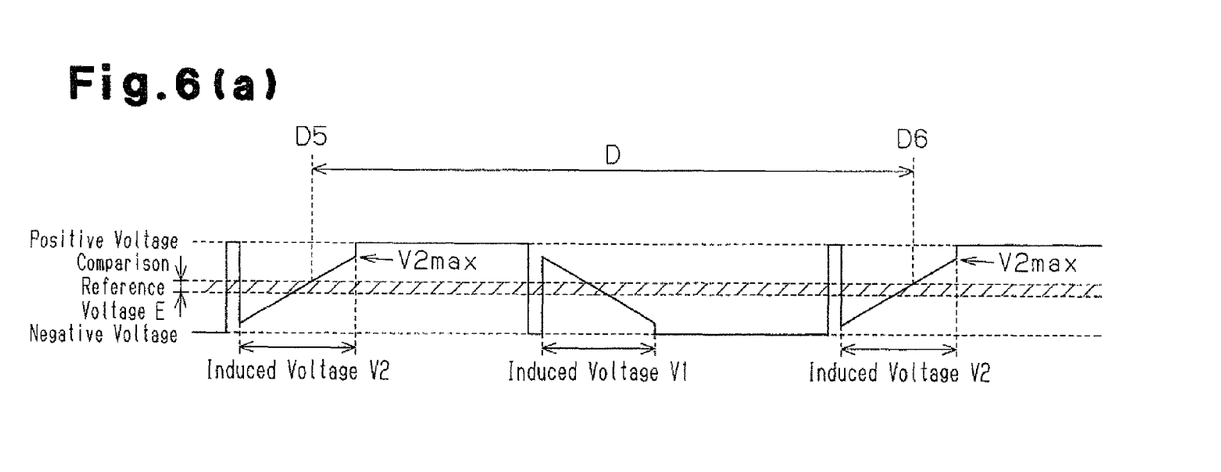
FIG. 6 includes graphs representing a voltage waveform of coils, in which (a) is a graph for explanatory illustration of induced voltage generated in a normal rotation state of a brushless motor, and (b) is a graph for explanatory illustration of induced voltage generated in a state immediately before the brushless motor loses synchronism.
Figure 6B:
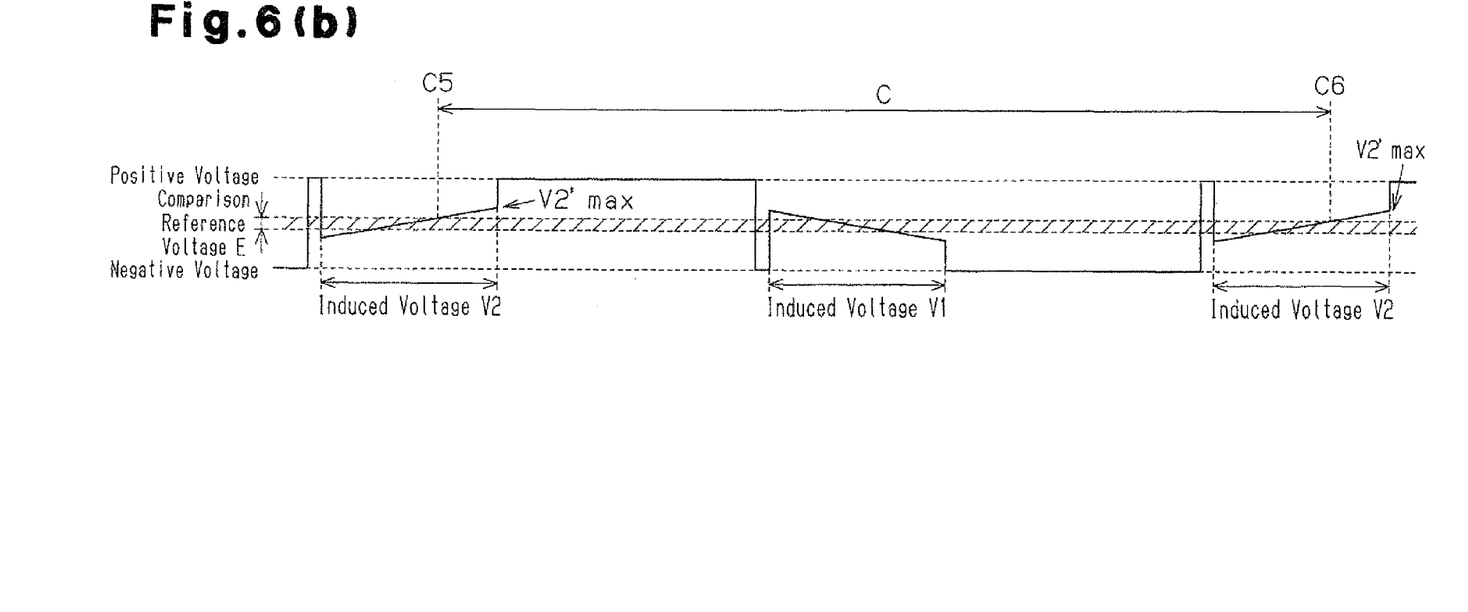

Alternatively, the synchronism loss determining section 73 may determine whether the brushless motor 6 has lost synchronism based on the time point at which the induced voltage V2, which is cyclically detected, exceeds the comparison reference voltage E. Specifically, the positive maximum value V2'max of the induced voltage V2 is small immediately before the brushless motor 6 loses synchronism, as illustrated in FIG. 6(b), compared to the corresponding value in the normal rotation state of the brushless motor 6 illustrated in FIG. 6(a). Also, the period from when the induced voltage V2 exceeds the comparison reference voltage E as the rotation speed of the rotor 62 drops to when the induced voltage V2 of the subsequent cycle exceeds the comparison reference voltage E is long in the state immediately before the loss of synchronism, compared to the normal rotation state. Accordingly, in Step S3, for example, this fact may be used to determine whether the brushless motor 6 has lost synchronism. In this case, through comparison computation between the induced voltage and the comparison reference voltage, the synchronism loss determining section 73 determines, as illustrated in FIG. 6(a), the time point D5 at which the induced voltage V2 of the current cycle exceeds the comparison reference voltage E and the time point D6 at which the induced voltage V2 of the subsequent cycle exceeds the comparison reference voltage E. Then, the synchronism loss determining section 73 obtains a time period D from the time point D5 to the time point D6. If the obtained time period D is longer than a reference time period C (see FIG. 6(b)) in the state in which the brushless motor 6 maintains synchronism, the synchronism loss determining section 73 determines that the brushless motor 6 has lost synchronism. If the time period D is equal to or shorter than the reference time period C, the synchronism loss determining section 73 determines that the brushless motor 6 maintains synchronism. The reference time period C is the time period from the time point C5 at which the induced voltage V2 of the current cycle exceeds the comparison reference voltage E to the time point C6 at which the induced voltage V2 of the subsequent cycle exceeds the comparison reference voltage E in the state immediately before the brushless motor 6 loses synchronism. As in the above-described embodiment, the reference time period C is preferably stored in advance in the memory section 75.

The synchronism loss determining section 73 may obtain the time point D1 and the time point D2 in every cycle and calculate the average time period from the time point D1 to the time point D2 as a time period D, which is compared with a reference time period C. Similarly, the synchronism loss determining section 73 may obtain the time point D3 and the time point D4 in every cycle and calculate the average time period from the time point D3 to the time point D4 as a time period D. Alternatively, the synchronism loss determining section 73 may obtain the time point D5 and the time point D6 in every cycle and calculate the average time period from the time point D5 to the time point D6 as a time period D.

The synchronism loss determining section 73 may calculate a reference time period C when the brushless motor 6 operates normally. Alternatively, the reference time period C may be the average of the times each calculated for every cycle.

Regardless of whether determination of the synchronism loss determining section 73 regarding the loss of synchronism is carried out based on the time points D3, D4, at which the induced voltage V1, which is cyclically detected, becomes equal to the comparison reference voltage E, or based on the time points D5, D6, at which the induced voltage V2, which is cyclically detected, exceeds the comparison reference voltage E, the synchronism loss determining section 73 may determine that the loss of synchronism has occurred if the comparison computation between the induced voltage and the comparison reference voltage cannot be performed normally, as in the case of the above-described embodiment. Specifically, when the induced voltage V1 or the induced voltage V2 is maintained in the range of the values of the comparison reference voltage E and the time point at which the induced voltage V1, V2 exceeds the range cannot be specified, it may be determined that the brushless motor 6 has lost synchronism.

In the above-described embodiment, the induced voltage detecting section 74 is employed to detect both of the induced voltage using which position of the rotor 62 is estimated and the induced voltage to be compared with the comparison reference voltage in order to determine whether the loss of synchronism has occurred. However, separate induced voltage detecting sections may be arranged in correspondence with the respective induced voltages.

In the above-described embodiments, the synchronism loss determining section 73 determines whether the brushless motor 6 has lost synchronism by comparing the induced voltage with the comparison reference voltage. However, the synchronism loss determining section 73 may determine whether the brushless motor 6 has lost synchronism by any other suitable method.

In the above-described embodiment, the hydraulic device receiving oil from the oil pump 5 is the continuously variable transmission T. However, the oil pump 5 may supply oil to any other suitable device, and the hydraulic device may be any other suitable automatic transmission other than the continuously variable transmission T.

DESCRIPTION OF REFERENCE NUMERALS

P . . . Electric Pump Device, T . . . Continuously Variable Transmission (Hydraulic Device), V1, V2 . . . Induced Voltage, E . . . Comparison Reference Voltage, 1 . . . Oil Pan (Oil Retainer), 2 . . . Oil Strainer, 3 . . . Mechanical Oil Pump, 4 . . . Engine (Internal Combustion Engine), 5 . . . Oil Pump, 6 . . . Brushless Motor, 7 . . . Controller, 71 . . . Power Supply Section, 72 . . . Drive Control Section, 73 . . . Synchronism Loss Determining Section, 74 . . . Induced Voltage Detecting Section, 75 . . . Memory Section, 80 . . . Check Valve.

The invention claimed is:

1. An electric pump device comprising:
an oil pump that supplies oil to a hydraulic device;
a brushless motor including a rotor that drives the oil pump; and
a controller that controls the brushless motor,
wherein the controller includes:
a power supply section that supplies drive power to the brushless motor;
a synchronism loss determining section that determines whether the brushless motor has lost synchronism; and
a drive control section, wherein, when the synchronism loss determining section determines that the brushless motor has lost synchronism, the drive control section controls the power supply section to start the brushless motor after controlling the power supply section to stop supply of the drive power to the brushless motor, wherein
the electric pump device does not include a relief valve.

2. The electric pump device according to claim 1, wherein the rotor of the brushless motor includes permanent magnets as field magnets, the controller further including an induced voltage detecting section that detects an induced voltage generated through rotation of the rotor and a memory section storing a comparison reference voltage, which is used to determine whether the brushless motor has lost synchronism; and
the synchronism loss determining section determines whether the brushless motor has lost synchronism by comparing the induced voltage with the comparison reference voltage.

3. The electric pump device according to claim 2, wherein to control the brushless motor, the controller estimates the position of the rotor using the induced voltage detected by the induced voltage detecting section.

* * * * *